United States Patent [19]
Ives

[11] Patent Number: 5,306,061
[45] Date of Patent: Apr. 26, 1994

[54] SHOVEL DEVICE

[76] Inventor: Robert N. Ives, 2308 Cheshire La., Alexandria, Va. 22307

[21] Appl. No.: 99,474

[22] Filed: Jul. 30, 1993

[51] Int. Cl.⁵ ................................................ A01B 1/02
[52] U.S. Cl. ...................................... 294/49; 209/419; 294/59
[58] Field of Search ................ 294/49, 51, 53.5, 54.5, 294/55-57, 59; 16/110.5; 209/417-419

[56] References Cited

U.S. PATENT DOCUMENTS

| 127,405 | 6/1872 | Butler | 294/49 |
|---|---|---|---|
| 902,954 | 11/1908 | Felty | 209/419 |
| 1,094,161 | 4/1914 | Mueller | 209/419 |
| 1,108,270 | 8/1914 | Staples | 209/419 |
| 1,277,279 | 8/1918 | Wiley | 209/419 |
| 1,427,523 | 8/1922 | Doyle | 209/419 |
| 2,518,432 | 8/1950 | Wotring | 294/49 |
| 4,475,757 | 10/1984 | Glock | 294/59 X |
| 5,205,122 | 4/1993 | Wong | 294/51 X |

FOREIGN PATENT DOCUMENTS 87403 2/1922 Austria ................................. 294/51

Primary Examiner—Johnny D. Cherry
Attorney, Agent, or Firm—Leon Gilden

[57] ABSTRACT

A shovel device is arranged to include a shovel blade having first and second ends, including a concave front wall coextensive with a convex rear wall, with spaced parallel ribs extending in a parallel relationship parallel to themselves and to the side walls of the shovel blade, with a mesh screen positioned over the ribs permitting sifting of soil enhancing its aeration during a shoveling procedure.

2 Claims, 4 Drawing Sheets

SHOVEL DEVICE

BACKGROUND OF THE INVENTION

1. Field of the Invention

The field of invention relates to shovel structure, and more particularly pertains to a new and improved shovel device wherein the same is directed to the sifting and aerating of soil.

2. Description of the Prior Art

Shovel devices of various types are utilized throughout the prior art, but wherein the instant invention is directed to enhancement thereover to permit in a gardening environment, the sifting action to employ a mesh screen extending over openings within the shovel blade to permit such sifting and turning of soil and in this respect, the present invention substantially fulfills this need.

SUMMARY OF THE INVENTION

In view of the foregoing disadvantages inherent in the known types of shovel structure now present in the prior art, the present invention provides a shovel device wherein the same employs a mesh screen positioned over spaced parallel ribs. As such, the general purpose of the present invention, which will be described subsequently in greater detail, is to provide a new and improved shovel device which has all the advantages of the prior art shovel structure and none of the disadvantages.

To attain this, the present invention provides a shovel device arranged to include a shovel blade having first and second ends, including a concave front wall coextensive with a convex rear wall, with spaced parallel ribs extending in a parallel relationship parallel to themselves and to the side walls of the shovel blade, with a mesh screen positioned over the ribs permitting sifting of soil enhancing its aeration during a shoveling procedure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved shovel device which has all the advantages of the prior art shovel structure and none of the disadvantages.

It is another object of the present invention to provide a new and improved shovel device which may be easily and efficiently manufactured and marketed.

It is a further object of the present invention to provide a new and improved shovel device which is of a durable and reliable construction.

An even further object of the present invention is to provide a new and improved shovel device which is susceptible of a low cost of manufacture with regard to both materials and labor, and which accordingly is then susceptible of low prices of sale to the consuming public, thereby making such shovel devices economically available to the buying public.

Still yet another object of the present invention is to provide a new and improved shovel device which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
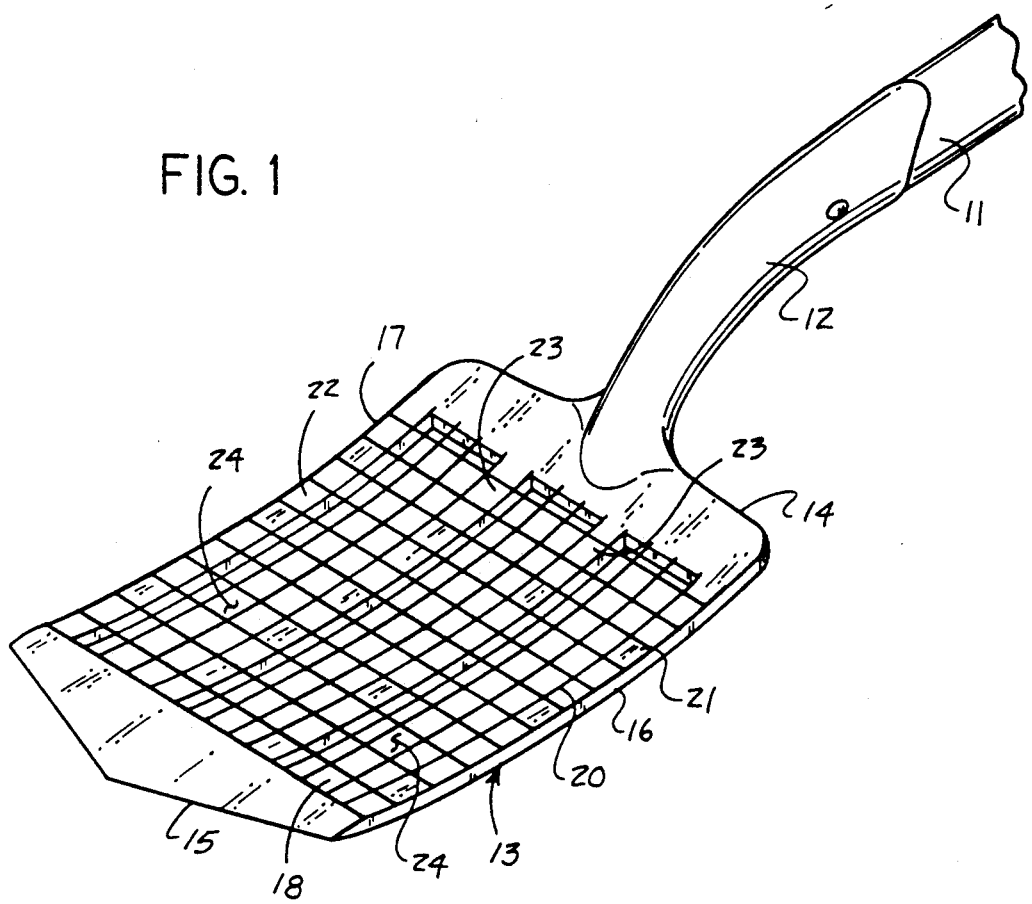
FIG. 1 is an isometric illustration of the invention.
Figure 2:
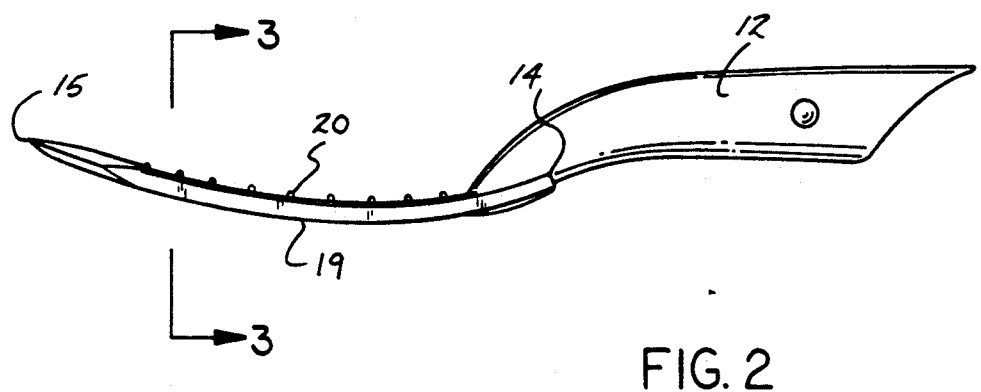
FIG. 2 is an orthographic side view of the invention.
Figure 3:
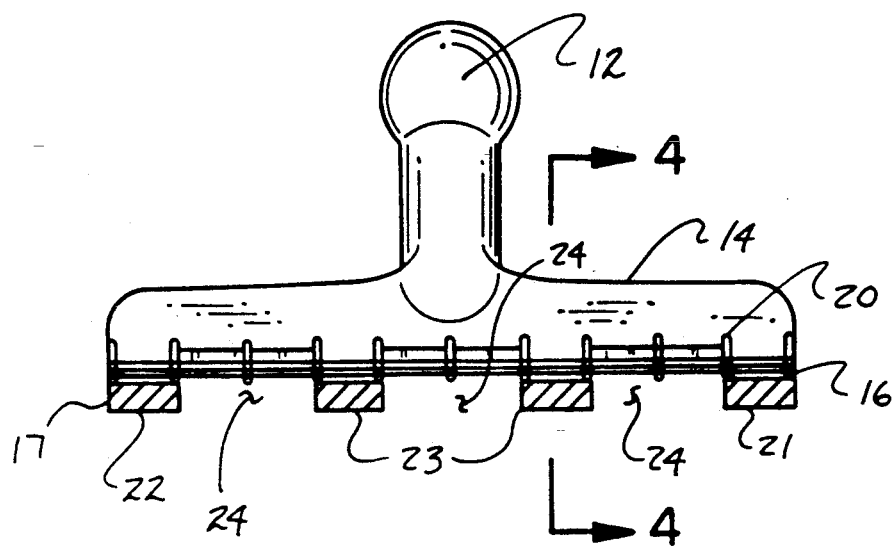
FIG. 3 is an orthographic view, taken along the lines 3—3 of FIG. 2 in the direction indicated by the arrows.
Figure 4:
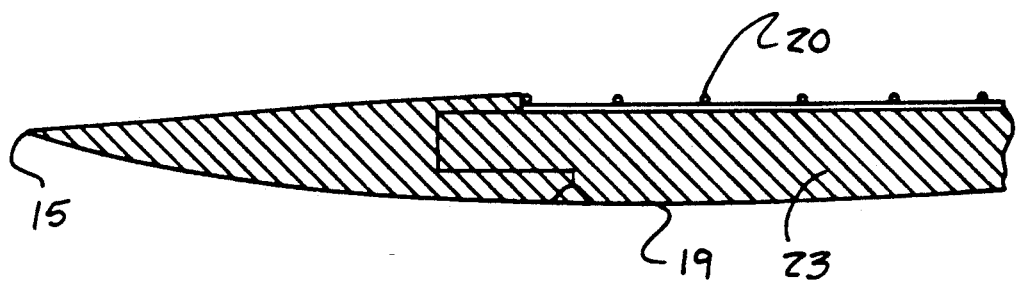
FIG. 4 is an orthographic view, taken along the lines 4—4 of FIG. 3 in the direction indicated by the arrows.

With reference now to the drawings, and in particular to FIGS. 1 to 8 thereof, a new and improved shovel device embodying the principles and concepts of the present invention and generally designated by the reference numerals 10 and 10a will be described.

More specifically, the shovel device 10 of the instant invention essentially comprises a handle 11 extending into a handle tube 12 that in turn is fixedly mounted to a shovel blade 13 at the shovel blade's first end 14. A shovel blade second end 15 spaced from the first end 14 is of a sharpened V-shaped edge configuration, as indicated, to enhance its projection into soil and the like. The shovel blade further is arranged with spaced parallel first and second sides 16 and 17. The shovel blade is configured with a concave front wall 18 spaced from and coextensive with a convex rear wall 19. A plurality of ribs include a first rib 21 adjacent the first side 16 spaced from and parallel to a second rib 22 coextensive with and parallel to the first rib 21 and coextensive with and adjacent the second side 17, with a plurality of intermediate ribs 23 extending between the first and second ribs 21 and 22, respectively, to define elongate parallel openings 24 between the ribs. Extending over the openings and fixedly secured to the front wall 18 is a mesh screen 20 coextensive with the openings and the ribs permitting sifting of soil through the openings 24 between the ribs 23 during a shoveling and turning procedure particularly for use in a gardening scenario.

Figure 5:
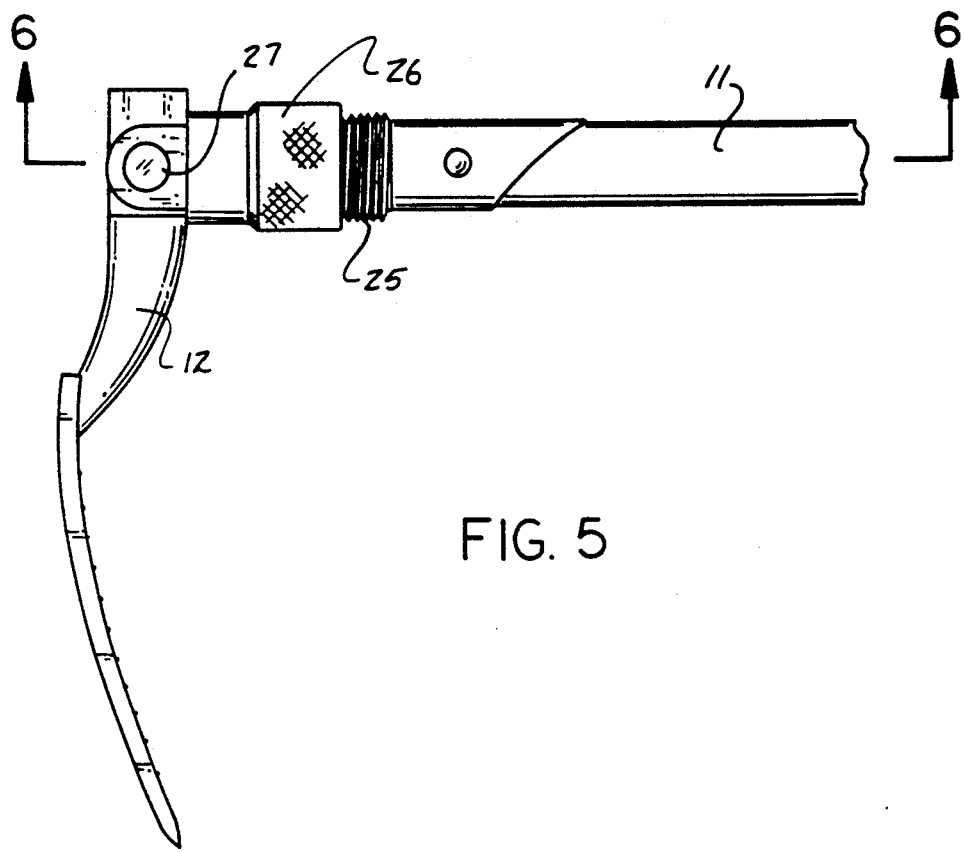
FIG. 5 is an orthographic view of the invention permitting pivoting of the shovel blade relative to the associated handle.
Figure 6:
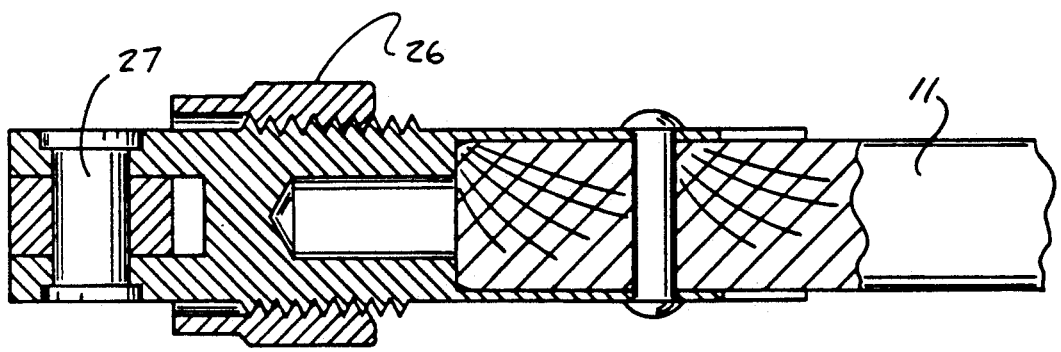
FIG. 6 is an orthographic view, taken along the lines 6—6 of FIG. 5 in the direction indicated by the arrows.

The FIGS. 5 and 6 indicate the use of the shank 11 including a threaded shank portion 25 having an internally threaded collar 26, wherein the handle includes a pivot axle 27 pivotally mounting the shovel blade relative to the handle such that projection of the collar along the threaded shank 25 abuts the shovel blade 13 to permit the shovel blade to be pivoted in an orthogonal orientation relative to the blade for use as hoe structure.

Figure 7:
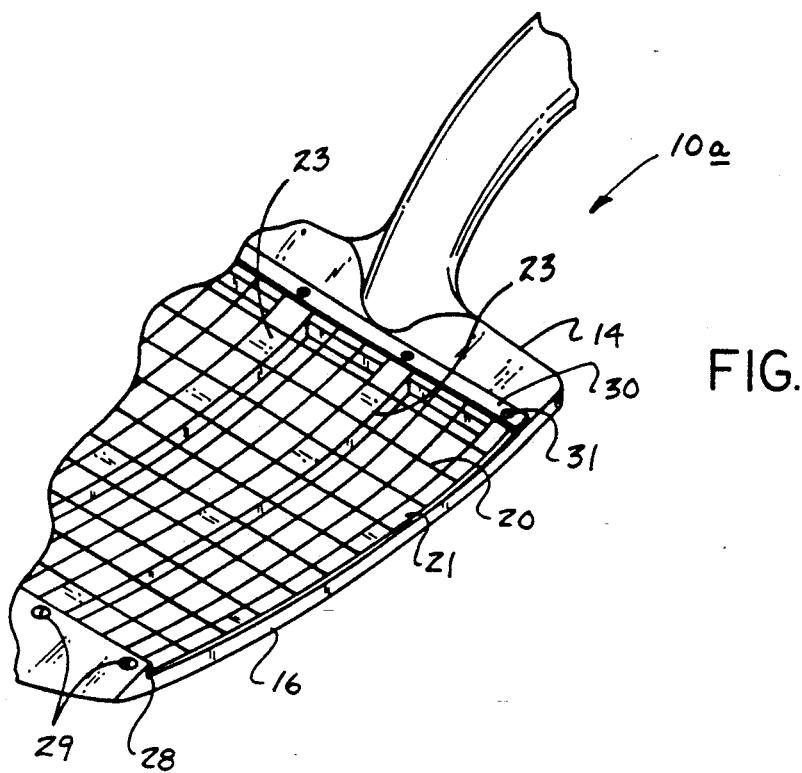
FIG. 7 is an isometric illustration of a modified shovel blade structure.
Figure 8:
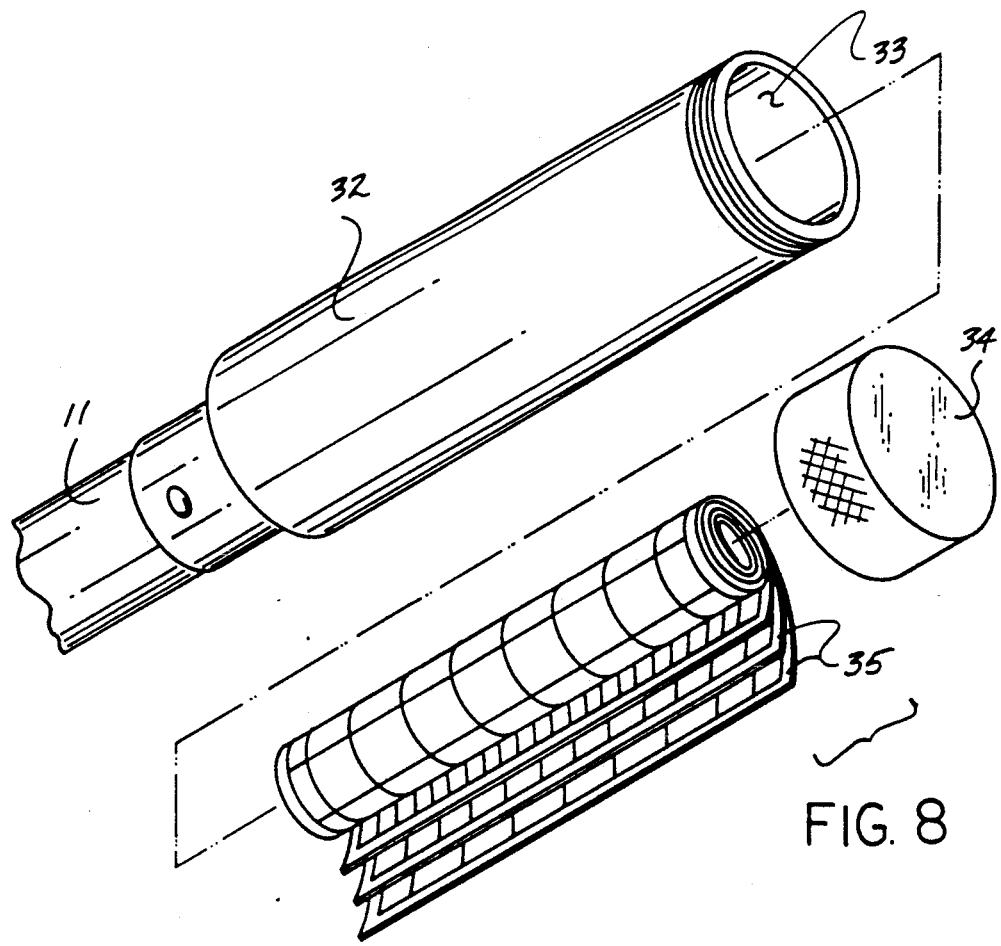
FIG. 8 is an enlarged isometric illustration of the outer distal end of the handle defining a storage container.

The FIGS. 7 and 8 indicate the use of a modified blade structure of the modified device 10a, having a screen receiving slot 28 orthogonally extending between the first and second sides 16 and 17 coextensive therewith, wherein the slot 28 receives a forward edge of the screen such that first fasteners 29 directed into the shovel blade secure the mesh screen received within the slot 28. A clamp plate 30 spaced from and parallel to the screen receiving slot 28 is oriented in adjacency to the first end 14, such that the clamp plate 30 includes second fasteners 31 securing the clamp plate 30 to the front wall 18, as well as clamping the mesh screen between the clamp plate and the shovel blade 13. To this end, various sizes of screens 35 of varying mesh sizes may be positioned for optional use onto the shovel blade 13 and stored within the handle container 32 fixedly mounted to the handle at its distal end spaced from the handle tube 12. The container 32 includes a container cavity 33 to secure the further mesh screens 35 therewithin, with a handle cap 34 arranged for securement to the handle container 32 for closing the container and the securement of the mesh screens therewithin.

As to the manner of usage and operation of the instant invention, the same should be apparent from the above disclosure, and, accordingly, no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A shovel device, comprising,
   a handle and a shovel blade, the shovel blade having a first end spaced from a second end, a first side parallel to and spaced from a second side, the first end including a handle tube with the handle received within the handle tube, and
   the shovel blade having a concave front wall coextensive with a convex rear wall, and
   a mesh screen fixedly mounted to the concave front wall coextensive between the first side and the second side, and
   a first rib extending along the first side between the first end and the second end, and a second rib extending along the second side between the first and second ends, with the first rib parallel to and spaced from the second rib, and at least one intermediate rib between the first rib and the second rib, with the intermediate rib coextensive with and parallel to the first rib and the second rib, and a plurality of elongate openings parallel relative to one another positioned between the first rib, the second rib, and the at least one intermediate rib, with the mesh screen extending coextensively over the openings permitting sifting of soil through the mesh screen and the openings, and
   a screen receiving slot fixedly mounted within the concave front wall in adjacency to the second end, with first fasteners directed into the slot from the front wall securing the mesh screen within the slot, and a clamp plate spaced from and parallel to the slot, with the clamp plate positioned between the openings and the first end, with second fasteners directed through the clamp plate into the front wall, with the clamp plate securing the mesh screen between the clamp plate and the front wall.

2. A shovel device as set forth in claim 1 including a handle container mounted to the handle spaced from the handle tube, with the handle container including a handle cap removably mounted relative to the handle container, with a handle cavity oriented within the handle container accessed upon removal of the handle cap, including at least one further mesh screen contained within the handle cavity, with the at least one further mesh screen of a varying mesh size relative to the mesh screen.

* * * * *